J. G. JONES.
PHOTOGRAPHIC FILM CARTRIDGE.
APPLICATION FILED JUNE 28, 1917.
1,272,454.
Patented July 16, 1918.
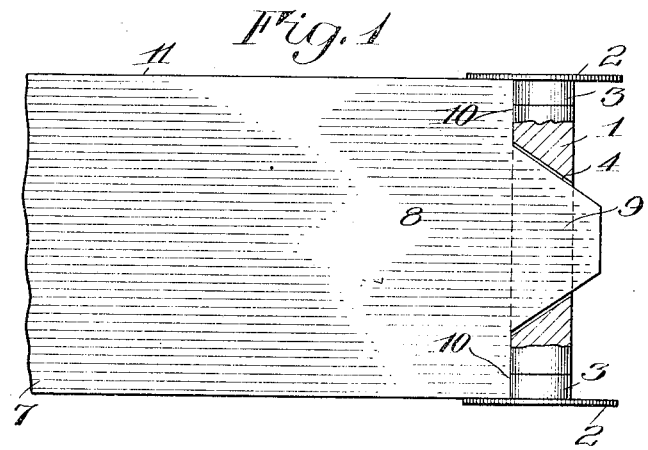
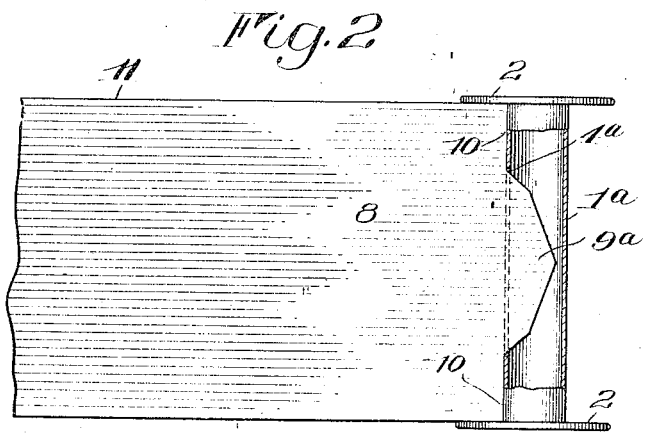
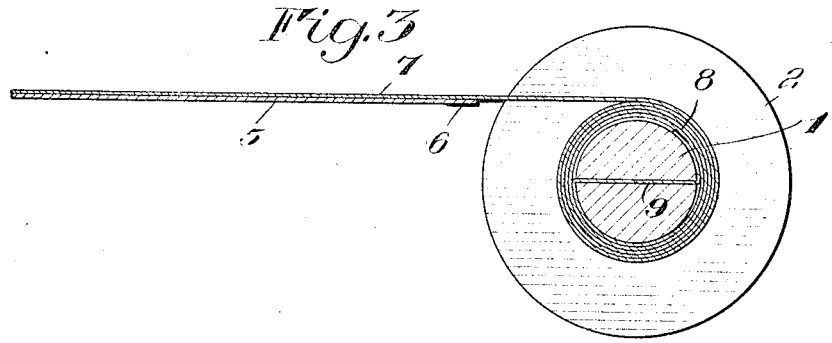
WITNESSES:
Nelson H. Copp
Russell D. Griffith
INVENTOR.
John G. Jones
BY
his ATTORNEYS.

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

1,272,454.

Specification of Letters Patent.  Patented July 16, 1918.

Application filed June 28, 1917. Serial No. 177,575.

*To all whom it may concern:*

Be it known that I, JOHN G. JONES, of Rochester, in the county of Monroe and State of New York, have invented certain new and useful Improvements in Photographic-Film Cartridges; and I do hereby declare the following to be a full, clear, and exact description of the same, reference being had to accompanying drawing, forming a part of this specification, and to the reference-numerals marked thereon.

My present invention relates to photography and more particularly to photographic roll films or cartridges composed of a central spool having a film strip wound thereon and the invention has for its object to provide means whereby the attachment of the lead end of the strip to the spool insures the even winding of the strip thereon without particular care being exercised to guide it squarely between the flanges. To these and other ends the invention resides in certain improvements and combinations of parts all as will be hereinafter more fully described, the novel features being pointed out in the claim at the end of the specification.

In the drawings:

Figure 1 is an elevation partly in section of a film spool, partly broken away, and the inner end of a film strip about to be wound thereon in accordance with my present invention;

Fig. 2 is a similar view showing the invention carried out with a spool of different construction;

Fig. 3 is a transverse section through the spool with the strip partially wound thereon.

Similar reference numerals throughout the several views indicate the same parts.

In the film cartridges heretofore most commonly used it has been the practice to simply roughly slot the spool and uniformly taper the attaching end of the film strip or the backing portion thereof so that it could be inserted in an approximately correct position and the strip then so guided in winding as to run it squarely onto the spool. With this arrangement, however, there is the difficulty that it is very easy to attach the tapered end of the strip at a point not exactly centrally of the spool and so that it is spread onto the latter in a direction that is not normal to the spool axis with the result that the convolutions are uneven and become crowded against the end flanges.

In the practice of my invention, as illustrated in Figs. 1 and 3, I employ a spool having a cylindrical wooden center or core piece 1 and metal end flanges 2 secured to the ends of the core by collars 3. The core is provided with a tapered longitudinal central slot 4 the ends of which are spaced from the flanges 2. The film strip 5 (Fig. 3) is attached by the usual tab 6 or otherwise to a paper backing 7 that constitutes at 8 a lead end for securing the film strip to the spool. The extremity of the lead end is in the form of a tapered tongue 9 positioned centrally of the strip and at the base of the tongue at each side the lead end 8 is formed with a shoulder 10. In each instance, this shoulder is at right angles to the longitudinal edge 11 of the strip. The tongue fits the slot 4 and when inserted therein, as shown in Fig. 1, the shoulders 10 abut squarely against the surface of the core 1 at right angles to the flanges 2 which alines the edges 11 of the strip exactly with the inner surfaces of these flanges and guides the strip squarely between the latter so that when it is wound as shown in Fig. 3, the convolutions are uniform and even and there is no crowding.

In the embodiment shown in Fig. 2, substantially the same elements are present except that the core 1ª of the spool is composed of a metal tube instead of being solid and the slot 4ª therein does not extend all the way through the tube being merely punched in one wall thereof. For this reason the tongue 9ª is shorter as it must be accommodated within the tube but the operation and functions of the shoulders 10 are the same.

I claim as my invention:

In a film cartridge, the combination with a spool embodying a core and end flanges, the core being provided with a longitudinal slot the ends of which are spaced from the end flanges, of a film strip having a lead portion provided with a tongue adapted to closely fit and be centered by the slot and having shoulders at each side of the base of the tongue that are parallel to the axis of the core and extend at right angles to the end flanges and the longitudinal edges of the strip, said shoulders being adapted to abut the surface of the core longitudinally thereof and automatically guide the longitudinal edges of the strip squarely between the end flanges.

JOHN G. JONES.

Witnesses:
Geo. C. Cooke,
C. E. Martin.